May 25, 1937.  R. LABORDA  2,081,750
VEHICLE
Filed March 28, 1936
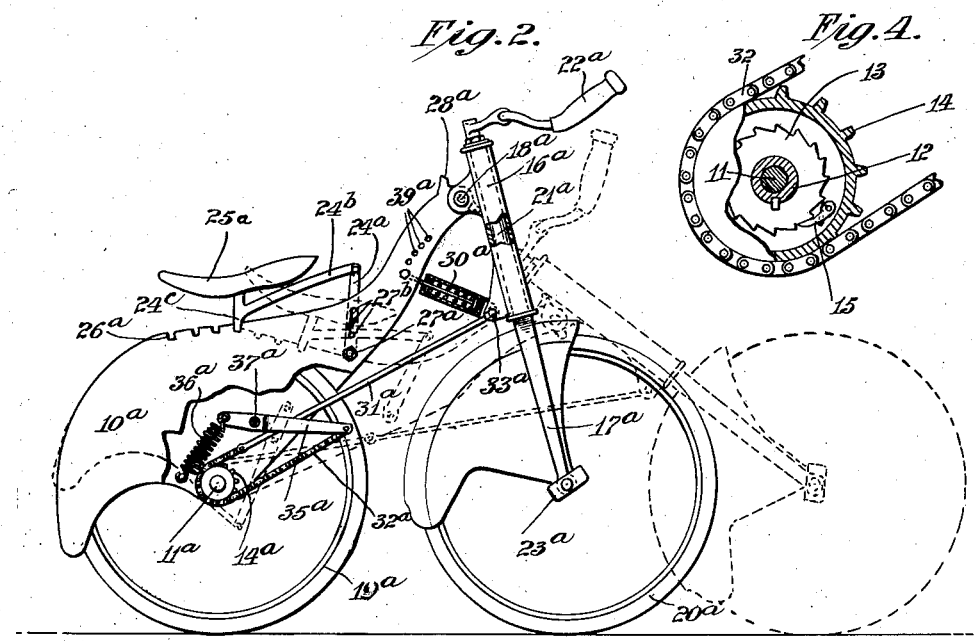
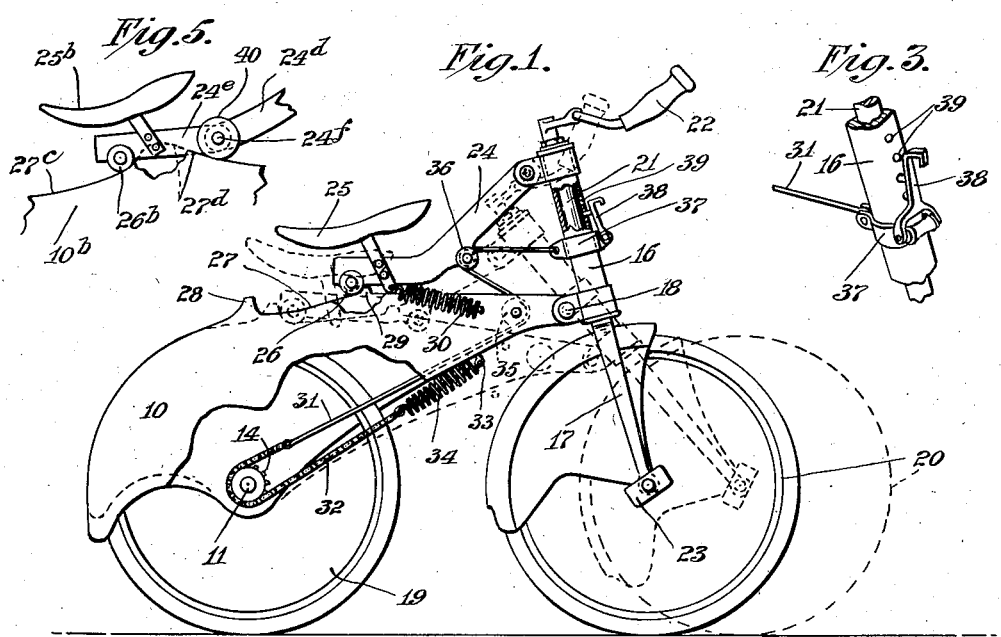
Richard Laborda
INVENTOR
ATTORNEY.

Patented May 25, 1937

2,081,750

UNITED STATES PATENT OFFICE 2,081,750

VEHICLE

Richard Laborda, Brooklyn, N. Y.

Application March 28, 1936, Serial No. 71,383

16 Claims. (Cl. 208—23)

The invention relates to vehicles, and more particularly to a manually propelled vehicle in which the driving power is developed by the use of both the arms and the legs of the user.

Vehicles of the type to which the invention relates are indended primarily for use by children, and the construction is such as to not only afford amusement, but to promote the muscular development of the user.

Essential structural characteristics of vehicles of the type to which the invention relates are a front frame or steering head having a rear frame pivotally connected intermediate the ends of the front frame, means offering resistance to relative pivotal movement of said members, a driving wheel carried by the rear frame, and an actuating mechanism including a one-way clutch mechanism carried by one of the wheels and connected with the two frames in a manner to develop the necessary propelling power when the front frame is oscillated about its pivotal connection with the rear frame. A seat is carried by the rear frame, which seat rises and falls with each actuation of the front frame, so that the weight of the user will be utilized in the development of driving power, and in some instances in limiting the amount of oscillatory movement of the front frame, although positive stops may also be used to limit this movement.

In a vehicle embodying the invention, adjustments are provided to permit variation in the resistance offered to the oscillatory movement of the front frame with the two-fold object of regulating the speed of the vehicle with a given oscillatory movement of the front frame, and determining the amount of muscular energy required to propel the vehicle.

A vehicle embodying my present invention is of the bicycle type in which the front frame, in addition to having the oscillatory movement incidental to the propelling of the vehicle, is free to be turned by means of handlebars for steering purposes. In two embodiments of the invention shown, the seat is movable in relation to the back frame with the oscillations of the front frame, with a relative vertical movement to more effectively utilize the weight of the rider in developing power for propelling the vehicle and in restoring the parts to normal or imparting a return reciprocation to the front frame following the application of power through said front frame to the driving wheel carried by the rear frame.

In a vehicle embodying the invention, the energy required to restore the parts to normal after each power developing oscillation of the front frame may be by a spring acting upon the power transmitting mechanism alone, or by a spring acting upon the front and rear frames, as well as by the weight of the rider, or a combination of these sources of energy.

In the use of a vehicle embodying the invention, the rider falls and rises with each direct and return reciprocation of the front frame, and the manner of mounting the seat may be such as to change the extent of the vertical movements of the seat.

The control of the speed of the vehicle may be determined by the effective leverage at which the front frame, in its oscillations, acts upon the power transmitting member operative upon the driving wheel, or by the adjustment of the tension of the spring resisting such oscillatory movement.

It is an object of the invention to provide parts so constructed and combined as to permit the production of the vehicle at low cost, and to so position the various parts that they will not interfere with the legs of a rider.

The seat of the vehicle is so located that the rider may reach the ground to avoid toppling of the vehicle, and also to permit a desired length of forward thrust of the front frame by the legs of the user.

An essential characteristic of the vehicle of the invention, as in other vehicles of the same type, is the vertical movement of the seat as the vehicle progresses, and the simultaneous application of power, in opposite directions, upon opposite sides of the point of pivotal connection of the rear frame with the front frame, so as to require the use of arm, leg and back muscles in propelling the vehicle.

The invention consists primarily in a vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, a seat supported from said rear frame, whereby with the oscillation of said front frame said seat rises and falls, means whereby pivotal movement of said front frame is resisted, and co-operating means upon said seat and upon said rear frame whereby the extent of movement of said seat with said rear frame, is determined; and in such other novel features of construction and combination of parts as are hereinafter set forth and described, and more particularly pointed out in the claims hereto appended.

Referring to the drawing,

Fig. 1 is a side view of a vehicle embodying the invention, partly broken away, and with the mode of operation indicated in dotted lines;

Fig. 2 is a view similar to Fig. 1 of a modified form of the invention;

Fig. 3 is a detail view of an adjustable member for regulating the operative effect of the power transmission mechanism;

Fig. 4 is a view, partly broken away, of one form of one-way clutch mechanism used in the embodiments of the invention shown in Figs. 1 and 2; and Fig. 5 is a view of a fragmentary portion of a modified form of seat mount.

Like numerals refer to like parts throughout the several views.

Referring to the form of the invention shown in Fig. 1, the vehicle has a rear frame 10, preferably of drawn sheet metal, so as to protect the upper parts of the wheel. Carried by and projecting between the opposite side walls of the frame is a shaft 11, having mounted thereon a hub 12. Carried by this hub is one member of a one-way clutch mechanism shown as a ratchet wheel 13. Idly mounted upon the shaft 11 is a sprocket wheel 14, this sprocket wheel inclosing the ratchet wheel 13, and having mounted within same a spring pressed pawl 15 constituting the other member of the one-way clutch mechanism.

Pivotally connected with the rear frame 10 is a front frame 16 forming a bearing for the shaft of a steering fork 17. The point of pivotal connection is a horizontal pivot 18 which is positioned intermediate the ends of the front frame 16. The hub 12 is a part of a driving wheel 19 mounted in the rear frame 10. Within the fork 17 of the front frame 16 is a front wheel 20. The front frame 16 has pivotally mounted therein the shaft 21 of the steering fork 17. The upper end of this shaft 21 is provided with ordinary handlebars or handholds 22. Carried by the lower end of the fork 17 are footholds 23. The handholds 22 and the footholds 23 are located upon opposite sides of the axis of pivotal movement of the front frame, so that when oscillating this front frame, it is necessary to apply energy to the opposite ends thereof, by means of the hand and footholds, but this energy is applied in opposite directions. When developing propelling power, the fork 17 is thrust forwardly, as indicated in dotted lines, and the handlebars 22 are drawn rearwardly. When oscillating the front frame in the opposite direction, the handlebars 22 are thrust forwardly.

Pivotally connected to the front frame 16 is a rearwardly extending seat supporting member 24 which carries the saddle 25 of the vehicle. This member 24 has means, as a roller 26, co-operating with an inclined plane 27 upon the top of the rear frame 10, the angle of this inclined plane determining the extent of vertical movement of the seat in its relation to the movement of the rear frame resulting from the oscillation of the front frame. The member 24 constitutes a part of the front frame and moves rearwardly and forwardly with the oscillations of said frame as a whole. The plane or track 27 upon the top frame may be so formed as to prevent excessive forward tilting of the saddle 25, as indicated in dotted lines, Fig. 1.

Abutments 28 and 29 are provided at opposite ends of the plane 27 for limiting the fore and aft reciprocatory movement of the saddle, these abutments also serving to limit the extent of oscillation of the front frame as a whole. Acting between the member 24 and the rear frame 10 is a spring 30 which, acting through the member 24, assists in the forward oscillation of the handlebar 22 following each power oscillation of the front frame.

The angle of inclination of the inclined plane 27 permits an effective utilization of the weight of the rider during the oscillation of the front frame to impart a forward thrust to the front wheel 20, and the spring 30 compensates in part for the additional power required in thrusting the handlebars 22 forwardly because of the lifting of the weight of the rider.

Power is transmitted to the sprocket wheel 14 by means of a flexible member 31 including therein a short length of sprocket chain 32. One end of this power transmitting means is connected at 33 with the rear frame 10, preferably through the medium of an expansion spring 34, which not only resists rearward movement of the upper end of the front frame, but which will, when tensioned, aid in a forward movement of the handlebar 22 carried by said front frame. The chain portion 32 co-operates with the sprocket wheel 14, and a flexible portion of said flexible member passes around a guide pulley 35 carried by the frame 10, and a guide pulley 36 carried by the seat supporting member 24, the end thereof being attached to a fitting 37 upon the front frame 16. The pulleys or rollers 35 and 36 are positioned between the sprocket wheel 14 and the front frame 16.

To permit control of the extent of turning movement of the driving wheel 19 through the medium of said power transmitting member, I make the fitting 37 adjustable longitudinally of the frame 16, employing a movable lock member 38 carried by said fitting, and adapted to enter one of a series of vertically alined openings 39 in said front frame.

In the embodiment of the invention shown in Fig. 2, the rear frame is indicated at 10a and the front frame at 16a. The shaft for the rear wheel and the one-way clutch mechanism is shown at 11a and the sprocket wheel for applying power to the driving wheel at 14a. The driving wheel itself is indicated at 19a. The fork of the front frame is indicated at 17a, its shaft mounted in the front frame 16a, at 21a, and the handlebar with its handholds at 22a. The footholds are shown at 23a.

The rear frame 10a is of the same construction as the rear frame 10 and, while pivotally connected with the front frame 16a at 18a at a point intermediate the ends of said front frame, the point of pivotal connection is very much closer to the handlebar with its handholds than is the pivotal point 18 shown in Fig. 1. This permits a more effective application of the power of the legs and the development of higher speed with each oscillation of the front frame.

Carried by the rear frame 10a is a fitting 24a having pivotally connected therewith a member 24b carrying the seat or saddle 25a. The member 24b carrying the seat is provided with a tongue 24c which is adapted to engage one of a series of notches 26a upon the rear frame 10a. The member 24a may be adjusted about a horizontal axis 27a to permit the engagement of the tongue 24c with any one of the notches 26a, and may also be adjusted vertically in relation to the rear frame by means of a line of openings 27b therein adapted to be engaged by the bolt 27a forming the pivot about which the member 24a may turn.

While, in the form of the invention shown in Fig. 1, the change in the angular position of the seat with the rise and fall of the rear frame is controlled by the inclined plane 27, in the form of the invention shown in Fig. 2 a similar result is secured by the adjustment of the seat or saddle along the rear frame 10a. The same condition also determines the extent of vertical movement of the seat with the oscillation of the front wheel, and the resulting movements of the rear frame.

While, in the form of the invention shown in Fig. 1, the abutments 28 and 29 serve to limit the oscillatory movement of the front frame, I provide, in the form of the invention shown in Fig. 2, an abutment 28a for limiting this movement.

Resistance to the movement of the front frame, in the form of the invention shown in Fig. 2, is offered by the spring rigging 30a in much the same manner as the spring 30 in the form of the invention shown in Fig. 1. While, in the form of the invention shown in Fig. 1, a sliding fitting 37 is employed to develop the desired resistance to the oscillation of the front frame and to vary this resistance, in the form of the invention shown in Fig. 2 a similar effect is secured by a series of openings 39a upon the rear frame with which the spring rigging 30a may be selectively connected.

Power is transmitted from the sprocket wheel 14 by means of a flexible member 31a including therein a short length of sprocket chain 32a cooperating with the sprocket wheel 14a. One end of this flexible connection is connected at 33a with the front frame 10, and the other end thereof is connected to the rear frame through the medium of a rocking lever 35a pivoted upon the rear frame and acted upon by a spring 36a. The lever 35a is pivoted at 37a to the rear frame, and the long arm of this lever is connected with the sprocket chain 32a.

In Fig. 5 of the drawing, I have shown a fragmentary portion of a further modification of the invention, in which two inclined planes are used for supporting the seat from the rear frame. In this form of the invention, I employ a seat supporting member 24d corresponding with the member 24 of Fig. 1 of the drawing, but differing therefrom in that the member, instead of being rigid throughout with a horizontal end section adjacent the rear frame, has an end section 24e pivoted at 24f to the member 24d. The end portion 24e carries a roller 26b which cooperates with an inclined plane 27c.

Adjacent the point of pivotal connection 24f is a bearing roller 40 riding upon an inclined plane 27d upon the rear frame, which, in this form of the invention, is indicated by the reference numeral 10b. The seat structure is shown at 25b in this embodiment of the invention. The use of the inclined plane 27d permits the utilization of the weight of the rider for imparting a forward thrust to the upper part of the front frame, so that a spring like the spring 30 is not required in this embodiment of the invention.

In the forms of the invention shown in Figs. 1 and 5, a longitudinal opening through the top of the rear frame must be provided for the passage of the seat carrying member during its rearward and forward movement and its changing position in relation to the rear frame, due to the use of an inclined plane or planes. This opening is also necessary to permit a proper movement of the guide pulley 36 in relation to the rear frame.

The operation of vehicles embodying the invention is substantially as follows:—

The rider sits upon the seat 25, 25a or 25b with his feet engaging the footholds 23 and 23a and with his hands grasping the handholes 22 and 22a.

In propelling the vehicle, the upper portion of the front frame is pulled toward the rider by means of the handholds 22—22a, and the lower portion thereof is thrust by the legs away from the seat. The oscillatory movement of the front frame causes the forward end of the rear frame to descend because of the change of angular position of the front frame, and also actuates the flexible power transmitting member in a manner to impart turning movement to the rear or driving wheel.

In the form of the invention shown in Fig. 1, the seat supporting member 24 has movement rearwardly with this movement of the front frame, and the rear portion of the member moves along the inclined plane 27 until the roller bearing 26 engages the abutment 28. This rearward movement of the member 24 is against the tension of the spring 30, so that the energy stored in this spring may be utilized to help restore the front frame to its normal position, shown in full lines, Fig. 1.

During the rearward movement of the member 24, the guide pulley 36 has movement away from the guide pulley 35, and, by reason of the oscillation of the member 24 about its point of pivotal connection with the front frame, the distance between the pulley 36 and the fitting 37 is increased. The pulley 36, being arranged in a bight in the flexible member, the amount of said flexible power transmitting member taken up by the movement of said pulley 36 will be sufficient to impart turning movement to the rear wheel through the medium of the one-way clutch mechanism shown in Fig. 4. Movement of the length 32 of sprocket chain can occur only as a result of expansion of the spring 34, thus storing up energy which, with the reversal of movement of the front frame, will act upon the upper portion of this front frame through the seat supporting member 24 to assist the spring 30 in restoring the front frame to its normal position.

The manner of supporting the seat or saddle from the rear frame permits the control or determination of the movements of the seat or saddle with the rear frame. By having the inclined plane 27 directed rearwardly and downwardly, the tilting of the seat, as compared with that of the rear frame, is considerably lessened, thus giving the effect of a rise and fall of the rider with the progress of the vehicle with a minimum of a forward pitch or overbalancing action due to excessive tilting of the seat.

In the form of the invention shown in Fig. 5, the seat movement is still further modified by the lifting of the member 24d as a result of the travel of the roller 40 along the inclined plane 27d, the effect of which, with the descent of the roller 26b along the inclined plane 27, will be to hold the seat against substantially all forward tilting movement, although it will have a rise and fall with the oscillations of the front frame. The inclined plane 27d, when the handlebars are thrust forwardly, will cause the weight of the rider upon the seat to assist in imparting a forward thrust to the upper portion of the front frame, securing an action similar to that of the spring 30.

As illustrated in Fig. 1, if it is desired to lessen the energy required to propel the vehicle, the fitting 37 is raised in relation to the front frame, thus lowering the amount of the flexible member taken up with the rearward movement of the guide pulley 36, with a resultant decrease in the tension developed in the spring 34. The less the amount of the flexible connection 31 taken up by the pulley 36, the lower will be the speed of the vehicle and the less energy will be required in developing that speed.

In the form of the invention shown in Fig. 2, the manner of developing power for propelling the vehicle is the same as in the form of the invention shown in Fig. 1, although the quantity of arcuate movement of the lower end of the front frame is relatively greater. The forward movement of the lower end of the front frame is resisted by the tension of the spring 30a, and the amount of pivotal movement of said frame is limited by the abutment 28a instead of by the abutment 28, as shown in Fig. 1.

While, in the forms of the invention shown in Figs. 1 and 5, the amount of vertical movement and pitching of the seat is determined by the movement of the seat supporting member, in the form of the invention shown in Fig. 2, the extent of such movement is determined by the setting of the seat supporting member 24b by means of the tongue 24c in one of the notches 26a. It will be noted that two of the notches shown in Fig. 2 are positioned forwardly of the shaft 11a and two of them rearwardly of said shaft. With the turning of the rear frame about said shaft, the lower end of the frame descends, as shown in dotted lines, accompanied by a decided forward pitching of the seat. By positioning the seat rearwardly of the frame, the amount of this pitching may be lessened, although there will always be a slight rise and fall of the seat.

So far as the application of power to the driving wheel is concerned, the spring 36a and the rocking lever 35a, one end of which is connected with said spring and the other end with the sprocket chain 32a, will offer resistance to the forward oscillation of the lower end of the front frame 16a and will, like the spring 34, assist in the return movement of said front frame.

In all forms of the invention shown, power is applied to the driving wheel as a result of the oscillation of the front frame through a flexible connecting member operating upon a one-way clutch mechanism including a sprocket chain co-operating with a sprocket wheel upon the driving wheel. The movement of said sprocket chain in each instance is against the tension of a spring which serves to not only impart a return movement to the sprocket chain but, through the flexible connection, a return movement to the oscillatory front frame.

In the form of the invention shown in Fig. 2, a spring acting between the two frames is employed to resist the oscillation of the front frame in one direction, and to assist its return oscillation. The weight of the rider in each instance is utilized to supplement muscular action in propelling the vehicle, and in each instance adjustment means are provided, in one instance an automatic adjustment during the operation of the vehicle, and in the other a fixed adjustment for causing a seat movement differing in degree from that of the rear frame supporting the seat.

In the embodiment of the invention shown in Fig. 5, the operating conditions are the same as heretofore described, with the exception that where a forwardly directed inclined plane is used, the weight of the rider is utilized to assist in imparting a return oscillation to the front frame, following the power developing oscillation thereof, thus permitting a spring, such as 30 or 30a, to be dispensed with.

In both forms of the invention shown, a one-way clutch mechanism is employed to permit a continuing movement of the vehicle during a return reciprocation of the front frame. While a pawl and ratchet clutch is shown, it is obvious that other forms of one-way clutch mechanisms may be used if desired.

It is not my intention to limit the invention to the precise details of construction shown in the accompanying drawing, it being apparent that such may be varied without departing from the spirit and scope of the invention.

Having described the invention, what I claim as new and desire to have protected by Letters Patent, is:—

1. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism is carried by said driving wheel, a flexible connection acting upon said clutch mechanism, one end of which is connected with said front frame and spaced from its point of pivotal connection with the rear frame, a seat supported from said rear frame, whereby with the oscillation of said front frame said seat rises and falls, means whereby pivotal movement of said front frame is resisted, and co-operating means upon said seat and upon said rear frame whereby the extent of movement of said seat with said rear frame, is determined.

2. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, a seat supported from said rear frame and adjustable thereon for movement toward and from said front frame, whereby with the oscillation of said front frame said seat rises and falls and the extent of such movement with said rear frame, is determined, and means whereby pivotal movement of said front frame is resisted.

3. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, a seat supported from said rear frame, said rear frame having an inclined plane upon the top surface thereof, a seat carrying member pivotally connconnected with said front frame and having its free end supported from said inclined plane, hereby with the oscillation of said front frame said seat rises and falls and the position of said seat will be automatically adjusted to determine the extent of such movement, and means whereby pivotal movement of said front frame is resisted.

4. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, a seat supported from said rear frame, said rear frame having an inclined plane upon the top surface thereof, a seat carrying member pivotally connected with said front frame and having its free end supported from said inclined plane, whereby with the oscillation of said front frame said seat rises and falls and the position of said seat will be automatically adjusted to determine the extent of such movement, abutments at opposite ends of said inclined plane engageable by said member to limit the extent of oscillation of said front frame, and means whereby pivotal movement of said front frame is resisted.

5. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, a seat supported from said rear frame, said rear frame having an inclined plane upon the top surface thereof, a seat carrying member pivotally connected with said front frame and having its free end supported from said inclined plane, whereby with the oscillation of said front frame said seat rises and falls and the position of said seat will be automatically adjusted to determine the extent of such movement, and an expansion spring having its opposite ends connected with said seat member and said rear frame, whereby pivotal movement of said front frame is resisted.

6. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, and the other end of which is connected with said rear frame, a seat supported from said rear frame, said rear frame having an inclined plane upon the top surface thereof, a seat carrying member pivotally connected with said front frame and having its free end supported from said inclined plane, whereby with the oscillation of said front frame said seat rises and falls and the position of said seat will be automatically adjusted to determine the extent of such movement, guide pulleys about which said flexible connection passes, one of said pulleys being carried by said seat supporting member, and the other by said rear frame intermediate said first named pulley and the point of pivotal connection of said rear frame with said front frame, and means whereby pivotal movement of said front frame is resisted.

7. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, and the other end of which is connected with said rear frame, a seat supported from said rear frame, said rear frame having an inclined plane upon the top surface thereof, a seat carrying member pivotally connected with said front frame and having its free end supported from said inclined plane, whereby with the oscillation of said front frame said seat rises and falls and the position of said seat will be automatically adjusted to determine the extent of such movement, guide pulleys about which said flexible connection passes, one of said pulleys being carried by said seat supporting member, and the other by said rear frame intermediate said first named pulley and the point of pivotal connection of said rear frame with said front frame, and an expansion spring having its opposite ends connected with said seat member and said rear frame, whereby pivotal movement of said front frame is resisted.

8. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection having an expansion spring in the length thereof acting upon said clutch mechanism, one end of which is connected with said front frame and spaced from its point of pivotal connection with the rear frame, and the other end of which is connected with said rear frame, a seat supported from said rear frame, said rear frame having an inclined plane upon the top surface thereof, a seat carrying member pivotally connected with said front frame and having its free end supported from said inclined plane, whereby with the oscillation of said front frame said seat rises and falls and the position of said seat will be automatically adjusted to determine the extent of such movement, guide pulleys about which said flexible connection passes, one of said pulleys being carried by said seat supporting member, and the other by said rear frame intermediate said first named pulley and the point of pivotal connection of said rear frame with said front frame, and an expansion spring having its opposite ends connected with said seat member and said rear frame, whereby pivotal movement of said front frame is resisted.

9. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, a seat supported from said rear frame, said rear frame having two inclined planes, one of which is forwardly directed, a seat carrying member pivotally connected with said front frame and having its free end supported from, and movable in relation to, said forwardly directed inclined plane, an extension to which said seat is connected, pivotally connected with said seat carrying member and co-operating with said other inclined plane, whereby with the oscillation of said front frame said seat rises and falls and the position of said seat will be automatically adjusted to determine the extent of such movement, and means whereby pivotal movement of said front frame is resisted.

10. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, a seat supported from said rear frame, a seat carrying member pivotally connected with said rear frame, manually operative means whereby the free end of said member may be adjusted along said rear frame, whereby with the oscillation of said front frame said seat rises and falls and the position of said seat will be automatically adjusted to determine the extent of such movement, and means whereby pivotal movement of said front frame is resisted.

11. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, said rear frame having a sequence of spaced notches therein, a seat member, means pivotally supporting one end thereof in relation to said rear frame, a seat carried by said member, a tongue upon said member adapted to be selectively engaged with one of said notches, whereby with the oscillation of said front frame said seat rises and falls and the position of said seat will be adjusted to determine the extent of such movement, and means whereby pivotal movement of said front frame is resisted.

12. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, a seat supported from said rear frame, a seat carrying member pivotally connected with said rear frame, manually operative means whereby the free end of said member may be adjusted along said rear frame, whereby with the oscillation of said front frame said seat rises and falls and the position of said seat will be automatically adjusted to determine the extent of such movement, and a string resisting pivotal movement of said front frame, the opposite ends of said spring being connected with said front and rear frames respectively.

13. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, a seat supported from said rear frame, a seat carrying member pivotally connected with said rear frame, manually operative means whereby the free end of said member may be adjusted along said rear frame, whereby with the oscillation of said front frame said seat rises and falls and the position of said seat will be automatically adjusted to determine the extent of such movement, a spring resisting pivotal movement of said front frame, the opposite ends of said spring being connected with said front and rear frames respectively, and means whereby said spring may be adjusted in relation to said rear frame, toward or from the point of pivotal connection of said frame with the front frame.

14. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, a rocking lever upon said rear frame adjacent said clutch mechanism, a spring acting upon one end of said lever, one end of said connection being connected with the other end of said lever, a seat supported from said rear frame, a seat carrying member pivotally connected with said rear frame, manually operative means whereby the free end of said member may be adjusted along said rear frame, whereby with the oscillation of said front frame said seat rises and falls and the position of said seat will be automatically adjusted to determine the extent of such movement, and means whereby pivotal movement of said front frame is resisted.

15. A vehicle embodying therein a rear frame, a driving wheel carried thereby, a front frame pivoted intermediate its ends to said rear frame, a steering wheel carried thereby, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said front frame and spaced from its point of pivotal connection with the rear frame, a rocking lever upon said rear frame adjacent said clutch mechanism, a spring acting upon one end of said lever, one end of said connection being connected with the other end of said lever, a seat supported from said rear frame, a seat carrying member pivotally connected with said rear frame, manually operative means whereby the free end of said member may be adjusted along said rear frame, whereby with the oscillation of said front frame said seat rises and falls and the position of said seat will be automatically adjusted to determine the extent of such movement, and a spring resisting pivotal movement of said front frame, the opposite ends of said spring being connected with said front and rear frames respectively.

16. A vehicle embodying therein a rear frame, a driving wheel carried thereby, a front frame pivoted intermediate its ends to said rear frame, a steering wheel carried thereby, a fitting adjustable longitudinally of said front frame, a steering bar adjacent the top of said front frame, footholds adjacent the bottom thereof whereby said frame may be oscillated by the simultaneous application of foot and arm power in opposite directions to opposite ends thereof, a one-way clutch mechanism carried by said driving wheel, a flexible connection acting upon said clutch mechanism, one end of which is connected with said adjustable fitting upon said front frame and spaced from its point of pivotal connection with the rear frame, and the other end of which is connected with said rear frame, a seat supported from said rear frame and adjustable thereon for movement toward and from said front frame, whereby with the oscillation of said front frame said seat rises and falls and the extent of such movement with said rear frame, is determined, and means whereby pivotal movement of said front frame is resisted.

RICHARD LABORDA.